Jan. 6, 1970  K. J. PATAY  3,487,525
ARMATURE WIRE STRIPPING TOOL
Filed March 22, 1967
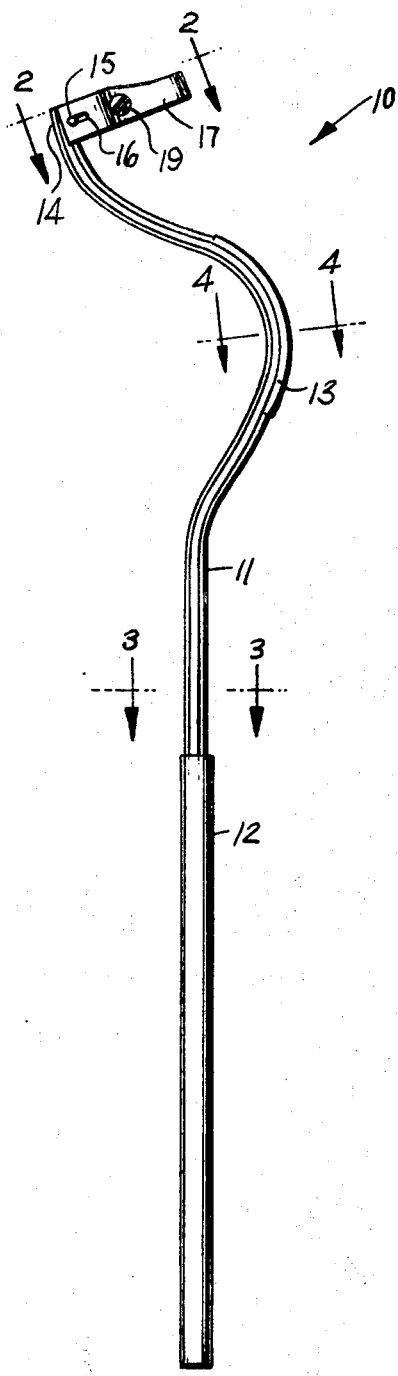
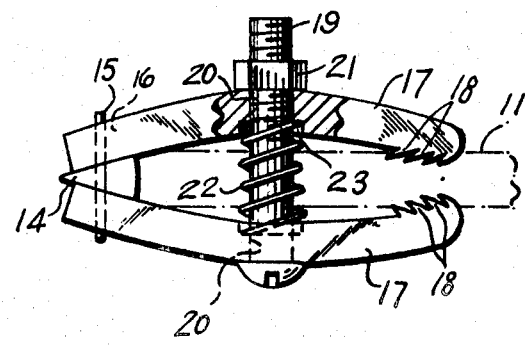
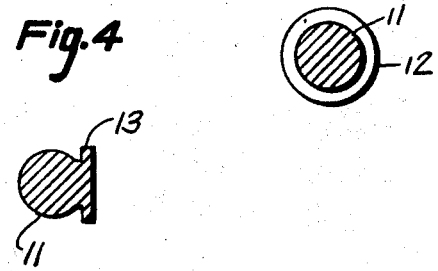
INVENTOR.
Karl J. Patay

United States Patent Office 3,487,525
Patented Jan. 6, 1970

3,487,525
ARMATURE WIRE STRIPPING TOOL
Karl J. Patay, 2254 Woodward Ave.,
Lakewood, Ohio 44314
Filed Mar. 22, 1967, Ser. No. 625,109
Int. Cl. H02k 15/00
U.S. Cl. 29—205                             5 Claims

ABSTRACT OF THE DISCLOSURE

A device for removing coil from armatures with an elongated handle portion, a pair of curved fingers having teeth for gripping the coil and a cross-bolt for adjusting the fingers.

---

This invention relates to hand tools and more particularly to a tool for manually stripping coils from armatures and the like.

It is therefore the main purpose of this invention to provide an armature coil stripping tool which will have a pair of arcuate and spring tensioned fingers at one end which will serve to grippingly engage and strip coil from an armature.

Another object of this invention is to provide an armature coil stripping tool which will have a bolt and associated nut which will allow adjustment of the fingers of the device.

A further object of this invention is to provide an armature coil stripping tool which when the fingers are tightened to the coil, will allow the coils to be pulled out of the armature immediately, thus saving a maximum amount of time and will also reduce the labor to a minimum.

Other objects and advantages of the invention will become apparent from a consideration of the following detailed description taken in connection with the accompanying drawing wherein a satisfactory embodiment of the invention shown, however, it is to be understood that the invention is not limited to the details disclosed but includes all such variaions and modifications as fall within the spirit of the invention and the scope of the appended claims.

In the drawing:

FIGURE 1 is a side elevation view of this invention;

FIGURE 2 is a view taken along the lines 2—2 of FIGURE 1, shown partly in section;

FIGURE 3 is a cross sectional view taken along the lines 3—3 of FIGURE 1;

FIGURE 4 is a cross sectional view taken along the lines 4—4 of FIGURE 1.

According to this invention, an armature coil stripping tool 10 is provided with a metal bar 11 having an elongated handle 12. Bar 11 is provided with an arcuate flange 13 which serves as a fulcrum of tool 10 when in use. Bar 11 is terminated at its upper extremity by a wedge-shaped end 14 which is secured with a pin 15 which rides in slots 16 and a pair of arcuately configurated fingers 17. Fingers 17 provided with a plurality of teeth 18 for the purpose of gripping the coil of the armature to be stripped. An externally threaded bolt 19 is freely received within opening 20 of finger 17 and a nut 21 received upon bolt 19 thus provides adjustment means for the spacing between fingers 17. Bolt 19 is received within a spring 22 between fingers 17 of tool 10, and each end of spring 22 rests within a recess 23 of fingers 7 and thus provides the necessary spring tension for the fingers 17.

In use, fingers 17 are adjusted to fit the coil to be stripped and the nut 21 is rotated to the desired position for the proper setting of the diameter of the coil to be stripped. Handle 12 of tool 10 providing the proper leverage is then pivoted while the flange 13 serves as a fulcrum.

It will be noted that the bar 11 of tool 10 may be of any desired cross-sectional configuration.

What I now claim is:

1. An armature coil stripping tool comprising, in combination, a bar member, an elongated handle carried by said bar providing leverage means to strip coil from an armature, a pair of arcuate configurated fingers carried by said tool for gripping the coils to be stripped from the armature and adjustment means for adjusting said tool to the size of the coil to be stripped from said armature.

2. The combination according to claim 1, wherein said bar is provided with an arcuate curved portion having an elongated flange, said flange serving as a fulcrum area for said tool, thus aiding the operator of said tool to quickly disengage coil from said armature.

3. The combination according to claim 2, wherein the upper extremity of the said bar of said tool is terminated by a wedge-shaped end, said wedge-shaped edge being received between said pair of arcuately configurated fingers and pin means secured to said wedge end and is freely received within elongated slots through one end of said fingers of said tool.

4. The combination according to claim 3, wherein, one end of said fingers are provided with a plurality of spaced apart teeth, said teeth providing a means for said fingers to grippingly engage coil to be stripped from an armature and a bolt is freely received within opening of said fingers and provides adjustment means for the gap between said fingers.

5. The combination according to claim 4, wherein, a spring is received upon said bolt between said fingers and each end of said spring is received in a recess of said fingers and such spring provides the proper tension upon said fingers.

References Cited

UNITED STATES PATENTS

| | | | |
|---|---|---|---|
| 2,723,443 | 11/1955 | McKibben | 29—205 X |
| 2,731,714 | 1/1956 | Dudley | 29—427 |
| 3,010,191 | 11/1961 | McCullough | 29—283 X |

THOMAS H. EAGER, Primary Examiner

U.S. Cl. X.R.

29—427